US011732768B2

(12) United States Patent
Eckerle et al.

(10) Patent No.: US 11,732,768 B2
(45) Date of Patent: Aug. 22, 2023

(54) FAILSAFE BRAKE DEVICE FOR ROBOTIC AND OTHER APPLICATIONS

(71) Applicant: SRI INTERNATIONAL, Menlo Park, CA (US)

(72) Inventors: Joseph Eckerle, Woodside, CA (US); Alexander Kernbaum, Sunnyvale, CA (US); Marisa de Souza, Hillsborough, CA (US)

(73) Assignee: SRI International, Menlo Park, CA (US)

( * ) Notice: Subject to any disclaimer, the term of this patent is extended or adjusted under 35 U.S.C. 154(b) by 136 days.

(21) Appl. No.: 17/202,013

(22) Filed: Mar. 15, 2021

(65) Prior Publication Data
US 2021/0301895 A1    Sep. 30, 2021

Related U.S. Application Data

(60) Provisional application No. 62/994,542, filed on Mar. 25, 2020.

(51) Int. Cl.
*F16D 67/06* (2006.01)
*F16D 13/10* (2006.01)
(Continued)

(52) U.S. Cl.
CPC .......... *F16D 67/06* (2013.01); *B25J 19/0004* (2013.01); *F16D 13/10* (2013.01); *H02N 13/00* (2013.01); *F16D 13/08* (2013.01); *F16D 27/025* (2013.01)

(58) Field of Classification Search
CPC ......... F16D 67/00–67/06; F16D 55/00–55/50; F16D 13/025; F16D 13/10; F16D 13/12;
(Continued)

(56) References Cited

U.S. PATENT DOCUMENTS 2,001,762 A * 5/1935 Blood ............... F16D 23/02
192/810
3,966,024 A * 6/1976 Baer ............... F16D 67/02
188/82.6
(Continued)

FOREIGN PATENT DOCUMENTS

JP  U53-139450 U    11/1978
JP  7-279989 A      10/1995
(Continued)

OTHER PUBLICATIONS

Spring Clutches, Tiny-Cluth Helander Products, Inc., https://www.tinyclutch.com/spring-clutches.htm, printed Mar. 16, 2021.

*Primary Examiner* — Richard M Lorence
(74) *Attorney, Agent, or Firm* — McDonnell Boehnen Hulbert & Berghoff LLP

(57) ABSTRACT

A variety of brake and/or clutch mechanisms, and improvements thereof, are provided having improved braking power, reduced size and weight, and other benefits. The braking mechanisms include a wrap spring clutch that is operable to mechanically couple a rotating member to a brake rotor that is in consistent contact with a brake pad. Actuation of the wrap spring clutch allows the wrap spring to engage with the rotating member, coupling the rotating member to the brake rotor thus braking the rotating member. The combination of the wrap spring clutch with the brake rotor and pad provides an overall braking mechanism that exhibits the decreased power cost, weight, size, and engagement time of the wrap spring clutch while having a braking power that can be moderated by specifying the area, engagement force, coefficient of friction, or other properties of the brake rotor and pad.

17 Claims, 9 Drawing Sheets

(51) Int. Cl.
  *H02N 13/00* (2006.01)
  *F16D 27/02* (2006.01)
  *F16D 13/08* (2006.01)
  *B25J 19/00* (2006.01)

(58) Field of Classification Search
  CPC . F16D 27/105; F16D 28/00; F16D 2065/1388
  USPC .................................. 192/12 BA; 188/71.2
  See application file for complete search history.

(56) References Cited

U.S. PATENT DOCUMENTS

2019/0085913 A1* 3/2019 Koenig .................. F16D 28/00
2019/0323277 A1 10/2019 Schmengler et al.

FOREIGN PATENT DOCUMENTS

JP      2008-101740 A    5/2008
JP      2019-190659 A   10/2019

* cited by examiner

900 ─┐

910 — DURING A DISENGAGEMENT TIME PERIOD THAT IS SUBSEQUENT TO A BRAKING TIME PERIOD, OPERATE A MOTOR TO ROTATE AN INPUT MEMBER IN A FIRST DIRECTION, THEREBY DISENGAGING A FIRST PORTION OF A FIRST WRAP SPRING OF A BRAKE FROM THE FIRST CONTACT SURFACE OF THE INPUT MEMBER, WHEREIN THE FIRST ACTUATOR ALLOWS MOTION OF THE FIRST END OF THE FIRST WRAP SPRING DURING THE BRAKING TIME PERIOD SUCH THAT ROTATION OF THE INPUT MEMBER IN A SECOND DIRECTION DURING THE BRAKING TIME PERIOD CAUSES THE FIRST PORTION OF THE FIRST WRAP SPRING TO ENGAGE WITH THE FIRST CONTACT SURFACE OF THE INPUT MEMBER, THEREBY MECHANICALLY COUPLING THE INPUT MEMBER TO THE BRAKE MEMBER SUCH THAT THE BRAKE PAD OPPOSES ROTATION OF THE INPUT MEMBER IN THE SECOND DIRECTION, WHEREIN THE SECOND DIRECTION IS OPPOSITE THE FIRST DIRECTION

↓

920 — SUBSEQUENT TO THE DISENGAGEMENT TIME PERIOD, (I) OPERATE THE FIRST ACTUATOR TO PREVENT MOTION OF THE FIRST END OF THE FIRST WRAP SPRING SUCH THAT THE FIRST PORTION OF THE FIRST WRAP SPRING DOES NOT ENGAGE WITH THE FIRST CONTACT SURFACE OF THE INPUT MEMBER AND (II) OPERATE THE MOTOR TO ROTATE THE INPUT MEMBER IN THE SECOND DIRECTION

FIGURE 9

FAILSAFE BRAKE DEVICE FOR ROBOTIC AND OTHER APPLICATIONS

CROSS-REFERENCE TO RELATED APPLICATION

This application claims priority to U.S. Patent Application No. 62/994,542, filed Mar. 25, 2020, which is incorporated herein by reference.

BACKGROUND

Unless otherwise indicated herein, the materials described in this section are not prior art to the claims in this application and are not admitted to be prior art by inclusion in this section.

Robots, vehicles, or other mechanical systems may include clutches to selectively couple and/or decoupled sources of rotation, translation, torque, and/or force from actuators, effectors, or other elements that may receive such inputs. For example, a clutch can selectively couple an engine to a transmission of a vehicle, thereby allowing the transmission to change gears while not 'under load' from the engine, allowing the engine to continue running while the vehicle is stopped, or allowing some other operation of the vehicle. A clutch may include a variety of elements and may be actuated in a variety of ways. For example, a friction clutch may include a pad or other friction surface that is selectively brought into contact with another friction surface, thereby allowing for graded transmission of torque between the friction surfaces while also allowing for some degree of slip (e.g., during an initial phase of clutching the friction surfaces together, at which point the relative speeds of the friction surfaces differ by a greater amount). Hydraulics, pneumatics, electromagnetics, or other means may be employed to actuate a pad, wrap spring, drum, or other element of a clutch.

A wrap spring clutch is a variety of clutch wherein the wrapping action of a spring disposed around and in contact with a shaft (or other mechanical member) results in engagement of the wrap spring with the shaft, thereby mechanically coupling the wrap spring to the shaft. Where the wrap spring is in contact with two (or more) shafts, the wrap spring may be configured to engage with both of the two (or more) members, thus mechanically coupling them together (or 'clutching' them together). Actuation of such a wrap spring clutch thus includes both rotation of the member(s) in a direction that results in engagement of the wrap spring and allowing the wrap spring to exhibit such engagement. Thus, actuation of such a wrap spring clutch can include controlling an end of the wrap spring (e.g., by exerting a force and/or displacement on a 'tang' or other terminal element of the spring) such that it is prevented from further wrapping down onto the member(s), thereby engaging with the member(s).

SUMMARY

Some embodiments of the present disclosure provide a brake including: (i) an input member having a first contact surface; (ii) a brake member having a brake surface; (iii) a brake pad that is in contact with the brake surface of the brake member such that the brake pad opposes rotation of the brake member; (iv) a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member; and (v) a first actuator, wherein the first actuator is operable for preventing an engaged mode of the first wrap spring and for enabling the engaged mode of the first wrap spring, wherein preventing the engaged mode of the first wrap spring comprises preventing motion of the first end of the first wrap spring such that the first portion of the first wrap spring does not engage with the first contact surface of the input member, and wherein enabling the engaged mode of the first wrap spring comprises allowing motion of the first end of the first wrap spring such that the first portion of the first wrap spring engages with the first contact surface of the input member, thereby mechanically coupling the input member to the brake member such that the brake pad opposes rotation of the input member.

Some embodiments of the present disclosure provide a system including: (i) a motor; (ii) a brake comprising: (a) an input member having a first contact surface, wherein the input member is coupled to an output of the motor; (b) a brake member having a brake surface; (c) a brake pad that is in contact with the brake surface of the brake member such that the brake pad opposes rotation of the brake member; (d) a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member; and (e) a first actuator, wherein the first actuator is coupled to the first end of the first wrap spring; and (iii) a controller comprising one or more processors, wherein the controller is configured to perform controller operations comprising: (1) during a disengagement time period that is subsequent to a braking time period, operating the motor to rotate the input member in a first direction, thereby disengaging the first portion of the first wrap spring from the first contact surface of the input member, wherein the first actuator allows motion of the first end of the first wrap spring during the braking time period such that rotation of the input member in a second direction during the braking time period causes the first portion of the first wrap spring to engage with the first contact surface of the input member, thereby mechanically coupling the input member to the brake member such that the brake pad opposes rotation of the input member in the second direction, wherein the second direction is opposite the first direction; (2) subsequent to the disengagement time period, (I) operating the first actuator to prevent motion of the first end of the first wrap spring such that the first portion of the first wrap spring does not engage with the first contact surface of the input member and (II) operating the motor to rotate the input member in the second direction.

Some embodiments of the present disclosure provide a clutch including: (i) an input member having a contact surface; (ii) an output member; (iii) a wrap spring having a first end and a second end, wherein a first portion of the wrap spring is proximate to the first end and is in contact with the contact surface of the input member, wherein a second portion of the wrap spring is proximate to the second end and is in contact with the output member, wherein the first portion of the wrap spring is located within the contact surface of the input member, and wherein rotation of the input member in a first direction when motion of the first end of the wrap spring relative to the input member is not prevented results in the first portion of the wrap spring engaging with the contact surface of the input member, thereby coupling the input member to the output member such that the output member receives, from the input member, a torque in the first direction.

Some embodiments of the present disclosure provide a clutch including: (i) an input member having a first contact surface and a second contact surface; (ii) an output member; (iii) a first wrap spring having a first end and a second end, wherein a first portion of the first wrap spring is proximate to the first end of the first wrap spring and is in contact with the first contact surface of the input member, and wherein a second portion of the first wrap spring is proximate to the second end and is in contact with the output member; (iv) a second wrap spring having a first end and a second end, wherein a first portion of the second wrap spring is proximate to the first end of the second wrap spring and is in contact with the second contact surface of the input member, and wherein a second portion of the second wrap spring is proximate to the second end and is in contact with the output member; and (v) an actuator coupled to the first end of the first wrap spring and to the first end of the second wrap spring, wherein the actuator is operable to: (A) prevent motion of the first end of the first wrap spring such that the first portion of the first wrap spring does not engage with the first contact surface of the input member, and wherein rotation of the input member in a first direction when the actuator is not preventing motion of the first end of the first wrap spring results in the first portion of the first wrap spring engaging with the first contact surface of the input member, thereby coupling the input member to the output member such that the output member receives, from the input member, a torque in the first direction, and (B) prevent motion of the first end of the second wrap spring such that the first portion of the second wrap spring does not engage with the second contact surface of the input member, wherein rotation of the input member in a second direction when the actuator is not preventing motion of the first end of the second wrap spring results in the first portion of the second wrap spring engaging with the second contact surface of the input member, thereby coupling the input member to the output member such that the output member receives, from the input member, a torque in the second direction, and wherein the second direction is opposite the first direction.

Some embodiments of the present disclosure provide a clutch including: (i) an input member having a contact surface; (ii) an output member; (iii) a wrap spring having a first end and a second end, wherein a first portion of the wrap spring is proximate to the first end and is in contact with the contact surface of the input member, and wherein a second portion of the first wrap spring is proximate to the second end and is in contact with the output member; and (iv) an electrostatic actuator, wherein the electrostatic actuator is operable to prevent motion of the first end of the wrap spring such that the first portion of the wrap spring does not engage with the first contact surface of the input member, and wherein rotation of the input member in a first direction when the actuator is not preventing motion of the first end of the first wrap spring results in the first portion of the first wrap spring engaging with the first contact surface of the input member, thereby mechanically coupling the input member to the output member such that the output member receives, from the input member, a torque in the first direction.

Some embodiments of the present disclosure provide a clutch including: (i) an input member having a first contact surface; (ii) an output member having a second contact surface; and (iii) a nested double wrap spring having a first sub-spring and a second sub-spring, wherein the first sub-spring is in contact with the first contact surface of the input member, wherein the second sub-spring is in contact with the second contact surface of the output member, wherein the first sub-spring has a first end and a second end, wherein the first sub-spring is coupled to the second sub-spring via the second end, wherein one of: (i) the first sub-spring is nested within the second sub-spring or (ii) the second sub-spring is nested within the first sub-spring, and wherein rotation of the input member in a first direction when motion of the first end of the first sub-spring is not prevented results in the first sub-spring engaging with the first contact surface of the input member, thereby mechanically coupling the input member to the output member such that the output member receives, from the input member, a torque in the first direction.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9 a flowchart depicting an example method.

DETAILED DESCRIPTION

Figure 1A:
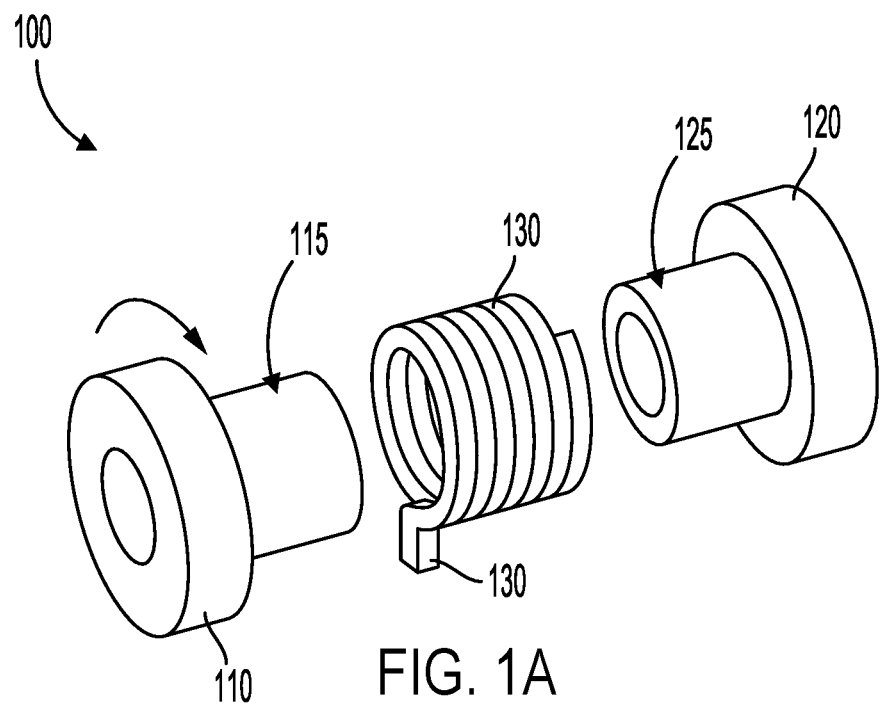
FIG. 1A illustrates elements of a wrap spring clutch, in accordance with an example implementation.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

A variety of systems and mechanisms include a brake in order to slow or stop elements in motion and/or to prevent nonmoving elements from moving. For example, a robot arm may include a brake (e.g., an emergency brake) for each of its degrees of freedom in order to prevent the arm from moving while it is being serviced, in order to quickly halt the motion of the arm during an emergency condition (e.g., loss of power, user actuation of an emergency stop button), or to provide some other benefits. It is generally desirable to, for a given level of braking power, reduce the size and/or weight of such a brake in order to reduce the size and weight of a system that includes the brake, to reduce the size, weight, and/or cost of motors or other elements used to drive such a system, to reduce the needed braking power of brakes of such a system, to reduce the cost of such a system, or to provide some other benefits related to the reduced size and/or weight of the braking mechanisms of such a system.

Embodiments herein apply a wrap spring as a clutch to selectively couple a drive shaft (e.g., an output shaft of a motor, an input or output shaft of a transmission, a drive shaft of a wheel or robot joint) to a brake rotor. A pad or other means is maintained in contact with the brake rotor such that rotation of the brake rotor is continuously resisted. Braking of the drive shaft is thus accomplished by allowing the wrap spring to engage with the drive shaft, thereby coupling the drive shaft to the brake rotor such that the brake pad can apply a large braking force to the drive shaft via the wrap spring and brake rotor.

Such a "safety brake" device may be applied for use in robots as well as other applications. Such brake devices may be used to cause the joints of a robot limb to "freeze" in an arbitrary orientation. For example, if the robot is working in a factory environment, various safety devices such as "light curtains" may be used to detect the presence of a person within the robot's work space. If a person is detected, the robot can automatically be put into "shutdown mode" as a safety precaution. In this mode, each of the robot's joints may be "locked" to its orientation at the time the person was detected. In order to improve the safety of such a "shutdown mode," the brakes used to lock each joint can be configured to be "engaged" (i.e. locked) when de-energized. Thus, in the case of a power failure, a robot including such braking mechanisms will be safely "locked" against motion.

Such a braking mechanism can provide a large braking force (related to the size or other properties of the brake rotor and brake pad) while allowing the braking force to be engaged by the relatively low force and/or torque actuation requirements of the wrap spring clutch. The size, weight, complexity, and/or cost of an actuator sufficient to prevent or permit the wrap spring from engaging with the drive member can be relatively much smaller than the size, weight, complexity, and/or cost of an actuator sufficient to "directly" actuate the brake pad and rotor by, e.g., controlling an amount of force applied by the brake pad onto the brake rotor. For example, the size, weight, complexity, and/or cost of an actuator sufficient to prevent motion of the tang of a wrap spring clutch relative to a drive shaft may be much less than the size, weight, complexity, and/or cost of the copper solenoid coil, iron "pole pieces," and other components of an electromagnetic actuator sufficient to control braking by controlling a degree of force applied between the brake pad and brake rotor. Leaving the brake rotor mechanically decoupled from the drive shaft can also permit such a brake mechanism to exhibit reduced rotational inertia relative to conventional brake mechanisms. This can be a significant advantage, especially in applications where a robot or other mechanism makes rapid moves repeatedly, thus permitting reduced cycle times and greater productivity and efficiency.

Such a braking mechanism also provides benefits relative to simply using a wrap spring clutch to couple the drive shaft to a mechanical ground (e.g., to the superstructure of a segment of a robot arm). The degree of braking power, deceleration profile, relationship between static and moving friction, or other properties of the wrap spring-clutched brake mechanism can be tailored to an application by specifying the size, composition, surface properties, or other aspects of the brake rotor and/or brake pad substantially independently of the properties of the wrap spring clutch. This can allow such a braking mechanism to avoid causing damage to a robot arm or other mechanism that could otherwise accrue as a result of the relatively larger magnitude of braking force caused by the rapid engagement of a wrap spring clutch alone. The large magnitude of the braking power provided by such a wrap spring clutch when used alone as a brake is related to the generally extremely rapid process of the wrap spring "wrapping down" onto the drive shaft. This rapid engagement behavior is inherent to the operation of a wrap spring clutch, making the use of a wrap spring clutch alone as a brake impractical in many applications, due to the extremely high magnitude and suddenness of the braking forces/torques. Such high, sudden loads can lead to increased fatigue, reduced device lifetime, and component failure.

In contrast to the problem of the above paragraph, in our invention, the wrap spring clutch engages rapidly, but the associated torque (and hence acceleration) is limited by the friction brake part of the device.

Many conventional safety brakes include an electromagnetic coil and associated iron "pole pieces" configured to exert a controllable and large-magnitude force in order to control the degree of force exerted between a brake pad and a brake rotor. For a given level of desired braking torque, the associated coil and pole pieces are relatively heavy. The weight of components located within a robot limb or other robot assembly can be a significant disadvantage for robots, particularly robots intended to work with humans ("cobots"). The brake pad(s) of a wrap spring clutched brake device of the present disclosure, by contrast, are maintained in contact with the corresponding contact surface(s) of brake rotor(s) of the brake device, continuously opposing the rotation of the brake rotor(s) regardless of the engagement and/or actuation of the wrap spring(s). The weight of a brake device of this disclosure for a given level of braking power can thus be much less than that of an equivalent-power conventional brake (e.g., a conventional electromagnetically-actuated brake) because it uses the engagement (or lack of engagement) of the wrap spring to control the level of applied braking power. Thus, a brake device of this disclosure can omit the large, heavy electromagnetic coil and pole pieces or may include relatively smaller coil and pole pieces configured to apply relatively smaller forces to the wrap spring in order to prevent engagement of the wrap spring until braking is desired. This weight advantage can be exploited to yield a lighter robot which is faster, safer and less expensive.

A brake device of this disclosure for a given level of braking power can also represent a decreased materials, assembly, and/or component cost relative to a conventional brake. The cost of materials can be a significant part of the total cost of conventional electromagnetic brakes. In particular, the cost of copper wire for the electromagnetic coil may be a significant fraction of the total cost. The cost of winding such a coil may also be significant. A safety brake device of this disclosure may employ a relatively smaller electromagnetic coil and/or may omit the electromagnetic coil entirely (e.g., may use an electrostatic actuator to control the engagement of the wrap spring). This can lead to lower material costs compared to a conventional electromagnetic brake. Such a brake may also represent a decreased power consumption relative to a conventional brake.

Also provided in this disclosure are a variety of improvements to this wrap spring-clutched brake embodiment. Such improvements include applying an electrostatic actuator to actuate the wrap spring, using a single actuator to actuate two wrap springs in common for braking in respective different directions, configuring a wrap spring to "wrap upward" out into an enclosing contact surface of a drive shaft, using a hybrid wrap spring that is configured to engage by having a first portion that "wraps downward" onto a first member (e.g., a drive shaft) and having a second portion that "wraps upward" out into an enclosing contact surface of a second member (e.g., a brake rotor), and other improvements. It is understood that such improvements, while being described in the context of improving the brake mechanisms described herein, may also be employed to improve generic wrap spring clutch mechanisms.

Note that reference is made throughout this disclosure to input members, output members, drive members, drive shafts, brake members, and ground members, with brake and/or clutch mechanisms incorporating such features generally being described as receiving rotational input via the input members, providing rotational output via the output members, and mechanically grounding the ground members. However, these embodiments are intended as non-limiting examples for illustrative purposes. One of skill in the art will appreciate that the function of input, output, and ground may be assigned to the various elements of the brakes, clutches, or other mechanisms described herein in a variety of ways according to an application.

Further, the term "member" (e.g., as in "input member") is intended to have a broad meaning unless otherwise indicated. While such members may be illustrated by way of example herein as singular cast, machined, of otherwise formed plates or otherwise-shaped elements, it is intended that a "member" may include multiple elements bolted, welded, screwed, clipped, press-fitted, or otherwise fastened together. The multiple elements of a "member" may be bolted, press-fitted, or otherwise fastened together such that they are in intimate contact (e.g., such that large surfaces of such multiple elements of a single "member" are in contact) or may be fastened together via intermediate additional elements of the member (e.g., via a set of rods, pins, cylinders, or screws that may pass through corresponding holes in some intervening member or other element of a device). For example, a "brake member" may include (i) a hub having one or more contact surfaces via which wrap spring(s) may engage with the brake member and (ii) a rotor having a brake surface via which a brake pad can exert braking forces onto the brake member. Such a hub and rotor of an overall "brake member" may be rigidly or non-rigidly coupled together. For example, the rotor and hub could include teeth, cogs, or other features configured to permit the hub and rotor to engage in a limited degree of rotation relative to each other.

II. EXAMPLE WRAP SPRING CLUTCH MECHANISMS

A wrap spring clutch is a clutching mechanism that includes at least one wrap spring. The wrap spring is wrapped around (or within) and in sliding contact with a contact surface of a drive shaft, input member, output member, or other mechanical member of interest. Rotation of such a drive shaft in a particular direction results in the wrap spring "wrapping down" onto the drive shaft, engaging with the contact surface of the drive shaft and thereby strongly mechanically coupling the wrap spring to the drive shaft. The drive shaft can thus be mechanically coupled to other mechanical elements (e.g., a brake member, an output shaft or other mechanical member) that are coupled to the wrap spring. The wrap spring may be coupled to such other elements directly (e.g., by being welded, bolted, press-fit, or otherwise directly coupled to the other element(s)) or via the "wrapping" process whereby a portion of the wrap spring engages with a contact surface of the other element(s).

This "wrapping down" to engage with the drive shaft can be reversed (or the wrap spring "disengaged" from the contact surface) by rotating the drive shaft opposite the particular direction that resulted in engagement of the wrap spring. Additionally or alternatively, the wrap spring can be directly disengaged from the drive shaft by exerting sufficient force on the wrap spring (e.g., on a tang of other feature formed on an end of the wrap spring) to disengage it from the drive shaft and/or to prevent it from rotating while the drive shaft rotates to disengage the wrap spring from the drive shaft.

Figure 1B:
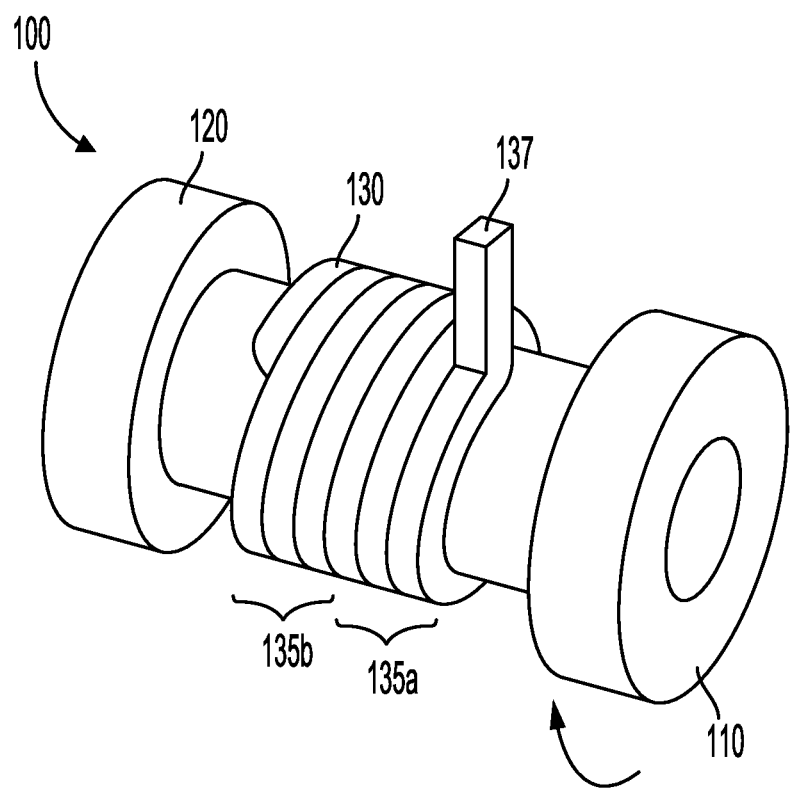
FIG. 1B illustrates elements of a wrap spring clutch, in accordance with an example implementation.

FIGS. 1A and 1B illustrate elements of an example wrap spring clutch 100, with FIG. 1A showing the elements in an expanded or disassembled view. An input member 110 is able to be clutched to an output member 120 by a wrap spring 130. Referring to FIG. 1B, when assembled, a first portion 135$a$ of the wrap spring 130 is in contact with a cylindrical contact surface 115 of the input member 110 and a second portion 135$b$ of the wrap spring 130 is in contact with a cylindrical contact surface 125 of the output member 120.

The "contact" of a wrap spring with its underlying contact surface when the wrap spring is not engaged (e.g., when an end of the wrap spring is prevented from moving with the underlying contact surface and thus "wrapping down" to engage with that contact surface) permits rotation of the contact surface relative to the warp spring. However, it is a direct mechanical contact and is characterized by some degree of sliding friction. Thus, some nonzero degree of torque will be transmitted between the wrap spring and the underlying contact surface via sliding friction between the wrap spring and the contact surface of the input member 110 when the contact surface moves relative to the wrap spring.

Rotation of the input member 110 in the direction indicated by the curved arrow can result in the wrap spring 130 "wrapping down" to engage with both the input member 110 and the output member 120, thereby mechanically coupling the input member 110 to the output member 120 such that rotation and/or torque in the indicated direction is transmitted, via the wrap spring 130, to the output member 120. Such "engagement" of a wrap spring with an underlying contact surface is characterized by a significantly greater mechanical coupling between the wrap spring and the contact surface due, e.g., to an increased normal force exerted by the wrap spring onto the contact surface. This increased normal force may be due in part to the capstan effect and/or other effects related to the enhanced mechanical coupling between the wrap spring and the contact surface. Accordingly, a wrap spring that is "engaged" with its underlying contact surface may exhibit a significantly increased torque exerted on the contact surface when subjected to further relative motion in the 'engagement' direction in comparison to when the wrap spring is disengaged from (and thus merely "in contact" with) the contact surface. This increased torque is due primarily to an effect that is sometimes called the "capstan effect" and that is exploited in devices such as a capstan (for driving a rope and/or for using a rope to drive another member). In practice, these factors, as well as other processes (e.g., compression of the member bearing the contact surface), may result in a wrap spring that is "engaged" with a contact surface being functionally rigidly coupled to the contact surface for purposes of further relative motion in the 'engagement' direction.

Rotating in the opposite direction will result in disengagement of the wrap spring 130 from the contact surfaces 115, 125 and substantially no transmission of torque from the input member 110 to the output member 120 (though some small amount of torque transmission, due to friction between the wrap spring 130 and the contact surfaces 115, 125, may occur).

A wrap spring clutch configured in this manner, absent additional elements, may be referred to as a "one way" or "overrunning" clutch, as the input member 110 is able to drive the output member 120 in one direction while "over-running" relative to the output member 120 when rotating in the opposite direction. Additional elements or features may be added to provide control of this clutching behavior, e.g., to allow the input member 110 to also over-run in the 'forward' direction by preventing the wrap spring from "wrapping down" and engaging with the contact surface 115 of the input member 110. This can be done by preventing the end 137 of the wrap spring 130 from rotating 'with' the contact surface 115 of the input member 110. Preventing such a motion of the end 137 of the wrap spring 130 can include preventing all motion of the end 137 of the wrap spring 130, e.g., by using an actuator to couple the end 137 to a mechanical ground. In another example, a slip clutch mechanism or other system could be employed to maintain the rate of rotation of end 137 of the wrap spring 130 at a level that is greater than a specified amount (e.g., a specified RPM) and less than the rate of rotation of the input member 110 in the direction of the arrow. In such an example, the output member 120 would rotate at the specified RPM, but only a negligible torque would be exerted on the input member 110.

Such a configuration permitting control of the clutching behavior of the clutch, which may be referred to a "start-stop clutch" configuration, may include an actuator or other component to control the motion of the end 137 of the wrap spring 130. This can include exerting forces on a "tang" formed on the end 137 of the wrap spring 130, as shown in FIGS. 1A and 1B. If the control tang 137 is free to rotate, this configuration acts similarly to the over-running configuration—the input can drive the output in only one direction (shown by the arrow) via engagement of the wrap spring 130 with the contact surfaces 115, 125. However, if a "stop" of some kind prevents the tang 137 from rotating, the input member 110 may rotate, but the output member 120 is not driven by the input member.

Such a stopped tang 137 prevents the wrap spring 130 from rotating with the input member 110 and thusly "wrapping down" on the contact surface 115 of the input member 110, allowing the input member 110 to rotate without also causing rotation of the spring 130 or output member 120. To effect stoppage of the tang 137, a "finger" or "pawl" (which may be actuated by an electrical solenoid or other means) may be used to stop the control tang directly. In some embodiments, an annular "stop collar" with a recess adapted to surround the control tang 137 of the spring 130 is provided. An additional "finger" or "pawl" can then engage with a cog-like feature on the periphery of the stop collar in order to stop the collar from rotating. This, in turn, prevents the rotation of the control tang 137, which prevents the wrap spring 130 from "engaging" with the input member 110.

The coil(s) of the wrap spring of such a wrap spring clutch may be "right-handed" or "left-handed," analogous to right-hand and left-hand threads. The "handedness" of the warp spring 130 in FIGS. 1A and 1B determines which direction of rotation will result in engagement of the wrap spring (the direction indicated by the arrow), and which will result in over-running and/or disengagement of the wrap spring. Thus, a wrap spring clutch may be configured to drive an output member in either a clockwise or counterclockwise direction, depending on the handedness of the spring used. Composite clutches may include multiple wrap springs so as to permit clutching in both directions.

Note that the wrap spring of a wrap spring clutch or other mechanisms described herein as generally described as "wrapping down" onto a contact surface of drive shaft that is enclosed within the wrap spring, thereby engaging the wrap spring with the contact surface and permitting transmission of more substantial torques between the drive shaft and wrap spring than if the wrap spring was in disengaged contact with the contact surface. However, as will be explained in greater detail below, it is also possible for the wrap spring of a clutch, brake, or other mechanism to "wrap upward" into a contact surface of a drive member (e.g., a drum-shaped member) that encloses the wrap spring. Such a configuration can provide a number of benefits. For example, such an "inside-out" wrap spring clutch could permit engagement of the wrap spring with the enclosing contact surface even at drive shaft rotation speeds that might, due to the levels of centripetal force generated, hinder or prevent "wrapping down" of a wrap spring clutch that enclosed an inner contact surface. Throughout this disclosure, it should be understood that an instance of a "standard" wrap spring that encloses the contact surface with which it engages may alternatively be configured, with appropriate modifications and where appropriate, as an "inside-out" wrap spring that is located within the contact surface with which it engages by "wrapping upward" into the contact surface.

III. EXAMPLE BRAKE MECHANISMS

As briefly described above, a brake mechanism can be provided that is superior with respect to size, weight, complexity, cost, and other factors relative to conventional brake mechanisms. This can be achieved by actuating a wrap spring clutch that can quickly and with a high power rating mechanically couple a drive shaft to a brake rotor that is maintained in contact with a brake pad. The force/power necessary to actuate the wrap spring (e.g., by selectively preventing or permitting motion of a control tang or other end portions of the wrap spring) can be substantially less than the power/force necessary to actuate the brake by controlling the amount of force exerted by the brake pad onto the brake rotor. Thus, the size, weight, cost, complexity, or other factors of the brake related to an actuator for effecting the control of such forces may be improved.

Figure 2A:
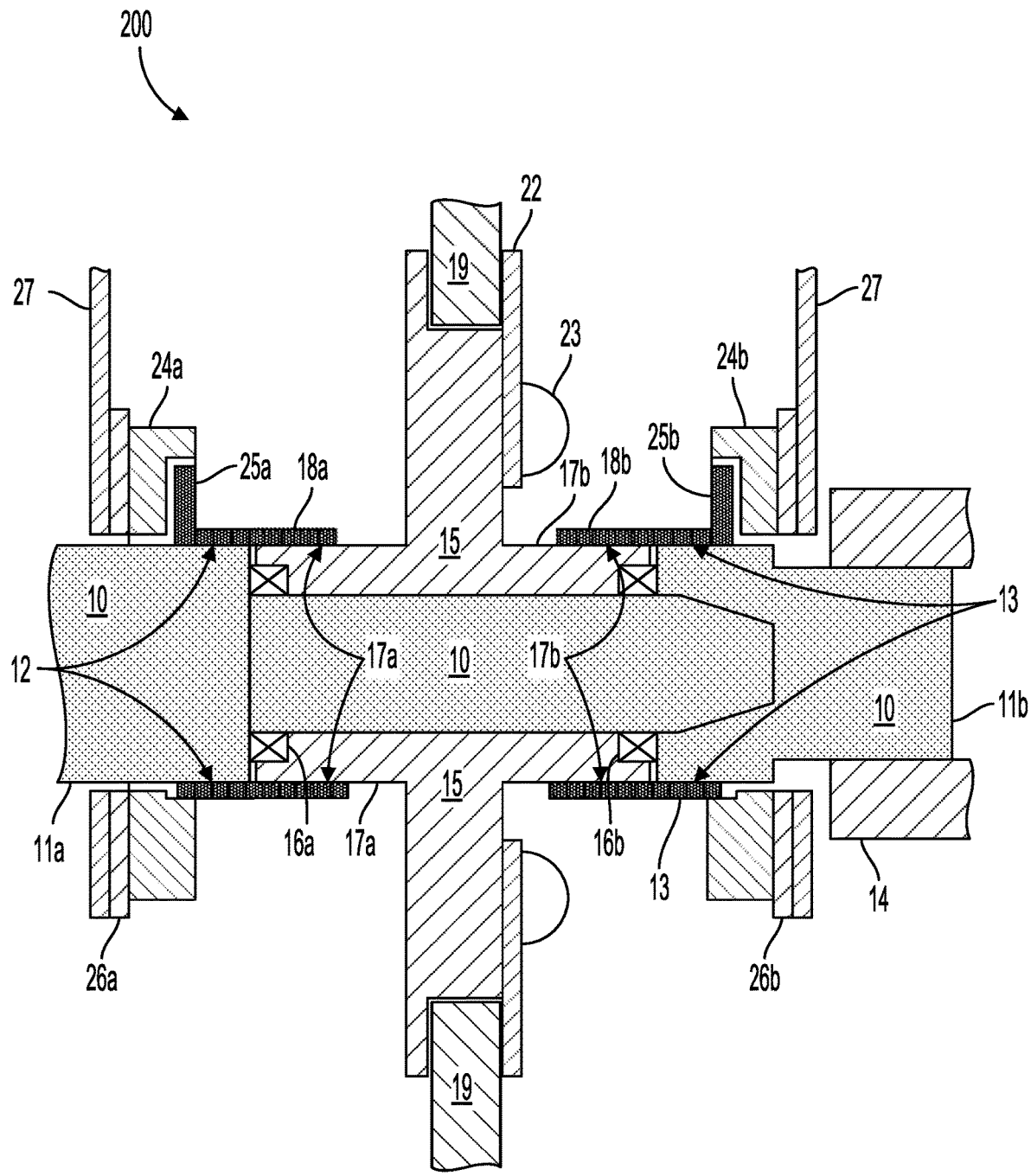
FIG. 2A illustrates, in cross-section, elements of a brake mechanism, in accordance with an example implementation.
Figure 2B:
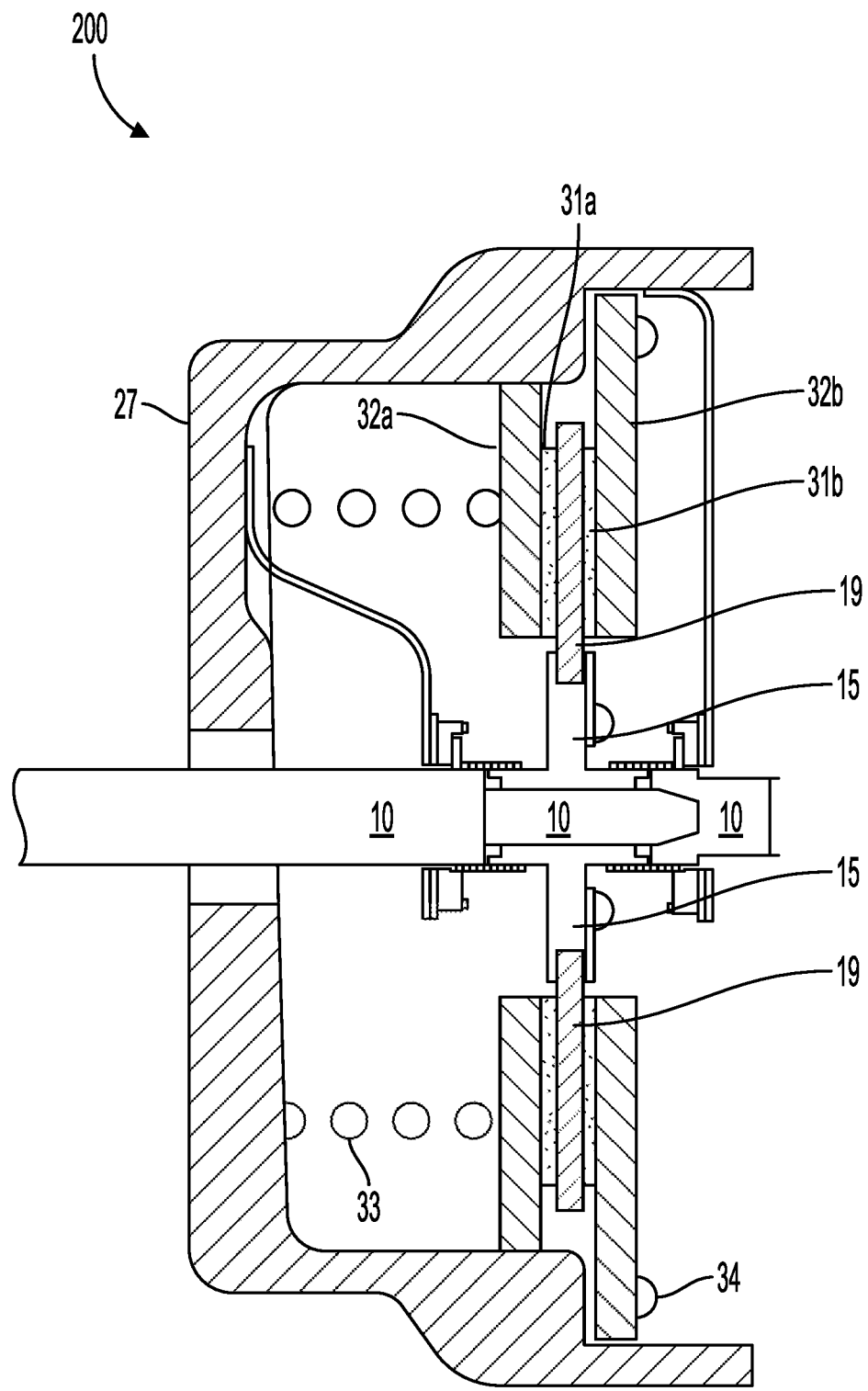
FIG. 2B illustrates, in cross-section, elements of the brake mechanism of FIG. 2A, in accordance with an example implementation.

FIGS. 2A and 2B illustrate in cross-section, by way of example, aspects of such a braking mechanism 200. The device 200 may be part of a robot, e.g., an instance of the device 200 may be included as an emergency brake for each "degree of freedom" (DOF) of the robot. Each DOF can be driven by a combination of a motor, a "safety brake" 200, and a transmission. The brake device 200 may be located between the motor and the transmission input shaft. However, note that a brake as described herein may be installed in various locations of a system without departing from the teachings of this disclosure, such as on the "rear" end of or otherwise incorporated into a motor, or at an intermediate stage of a transmission.

An input member 10 passes through the center of the brake device 200. A first end 11a of the input member 10 could be coupled to a motor (and thus referred to as the "input" end of the device 200) and a second end 11b of the input member 10 could be coupled to a transmission, drive shaft, or other component (and thus referred to as the "output" end of the device 200). As shown, such an input member 10 may include a number of components coupled together, e.g., an input shaft having a tapered hub configured to be attached to an output shaft e.g., via a key, a bolt, a weld, press-fitting, or some other coupling means. The input member 10 includes a cylindrical, outward-facing first contact surface 12 and a cylindrical, outward-facing second contact surface 13.

The device 200 additionally includes a brake member that includes a hub 15 and a rotor 19. The hub 15 is coaxial with and disposed around a portion of the input member 10. The hub 15 is supported on the input member 10 by two bearings 16a and 16b (e.g., brass bushings, roller bearings, etc.). The hub 15 is thus free to rotate on the input member 10. The hub 15 includes a first contact surface 17a and a second contact surface 17b. The rotor 19 is mounted on the hub 15 and maintained in position relative to the hub 15 by a retaining ring 22 that is fastened to the hub 15 by two or more fasteners 23, e.g., rivets or screws. As described in greater detail below, the rotor 19 is able to rotate relative to the hub 15 by less than a specified amount. Note, however, that such a configuration of a brake member is intended as a non-limiting example and that a brake member of a wrap spring-clutched brake device as described herein could include more or fewer components configured in similar or different ways. For example, a brake member could be formed from a single piece of material (e.g., a cast piece of metal) that includes both a contact surface for a brake pad and a cylindrical contact surface for contact and/or engagement with one or more wrap springs.

A pair of brake pads 31a and 31b are bonded to backing plates, 32a and 32b. These brake pads 31a, 31b are maintained in contact with respective contact surfaces of the rotor 19. The brake pads 31a, 31b are pushed against the rotor 19 by a coil spring 33. The inner backing plate 32a is prevented from rotating by means of spline-like features on its periphery that mate with similar features (not shown) on an inner surface of the housing (mechanical ground) 27. The outer backing plate 32b is fastened to the housing 27 with fasteners 34. The combination of the brake pads 31a, 31b, backing plates 32a, 32b, and spring 33 prevent the rotation of the rotor 19 relative to the housing 27 until a certain torque (the "nominal torque" for the device) is reached. If the sum of externally applied torques on the input and output ends 11a and 11b exceeds the nominal torque while at least one of the wrap springs 18a, 18b is engaged to couple the input member 10 to the rotor 19, then the rotor 19 will begin to rotate relative to the housing 27.

As seen in FIG. 2A, the device 200 yet further includes a first wrap spring 18a and a second wrap spring 18b. The first wrap spring 18a includes a first portion (to the left in FIGS. 2A/B) that is in contact with the first contact surface 12 of the input member 10 and a second portion (to the right in FIGS. 2A/B) that is in contact with the first contact surface 17a of the hub 15 of the brake member. The second wrap spring 18b includes a first portion (to the right in FIGS. 2A/B) that is in contact with the second contact surface 13 of the input member 10 and a second portion (to the left in FIGS. 2A/B) that is in contact with the second contact surface 17b of the hub 15 of the brake member.

Stop collars 24a and 24b are attached to stop tangs 25a and 25b of the two wrap springs 18a, 18b, respectively. These collars also rotate against the faces of first 26a and second 26b actuators, respectively. The actuators 26a, 26b can operate to mechanically couple their respective stop collars 25a, 25b to a mechanical ground 27, thereby preventing motion of their respective stop tangs 25a, 25b. Thus, the actuators 26a, 26b can operate to prevent the input member 10 from being mechanically coupled, via one or the other of the wrap springs 18a, 18b, to the brake member and being thereby impeded from rotating by the action of the brake pads 31a, 31b on the rotor 19 of the brake member. This could be referred to as the "normal operation" of a robot with the "safety brake" disengaged. With the actuators 26a, 26b thusly engaged, the associated stop collars 24a, 24b are prevented from rotating. In turn, the stop collars 24a and 24b prevent their associated tangs 25a, 25b from rotating. As described above, when such tangs are prevented from rotating, their respective wrap springs 18a, 18b are disengaged from respective contact surfaces 12, 13 of the input member 10. Therefore, the hub 15 is effectively disconnected from the input member 10. Thus, the input member 10 is free to rotate in either direction, driven by, e.g., a motor.

Alternatively, the actuators 26a, 26b can operate to permit the stop collars 24a, 24b, and thus their respective stop tangs 25a, 25b, to rotate. Thus, the actuators 26a, 26b can operate to allow the wrap springs 18a, 18b to become engaged with the first 12, 17a and/or second 13, 17b contact surfaces of the input member 10 and hub 15, thereby mechanically coupling the input member 10 to the rotor 19. Note that engagement of one or the other of the wrap springs 18a, 18b requires both the actuators permitting movement of the corresponding stop collar 24a, 24b and rotation of the input member 10 in the corresponding direction, thereby causing rotation of the corresponding stop tang 25a, 25b and "wrapping down" of the corresponding wrap spring 18a, 18b. This rotation may be due to torque exerted by a motor, inertia, gravitational forces exerted on, e.g., a robot limb segment driven by the input member 10, and/or some other cause of rotation of the input member 10.

In embodiments where the device 200 is employed as an "emergency brake" (e.g., for a DOF of a robot arm), the actuators 26a, 26b could be configured to permit rotation of the stop collars when power is removed (so-called "failsafe" operation). In such examples, maintaining the device 200 in a non-braking state of operation could require the input of some non-zero amount of power (e.g., a small current at high voltage to maintain an electrostatic clutch of the actuators 26a, 26b in a "clutched" state, or a larger current at lower voltage through a coil of a solenoid of the actuators 26a, 26b to maintain a "finger" or "pawl" in position to prevent rotation of the stop collars.

In another embodiment of an electromagnetically-operated actuator 26a, 26b, the stop collars 24a, 24b have a face in contact with the associated actuator 26a, 26b and are composed of a ferromagnetic material (e.g., iron). Each actuator 26a, 26b includes a cup-shaped ferromagnetic "core" with a solenoid coil secured (e.g., glued) within a recess in the core (such a core is commonly referred to as a "pot core"). If the coils are not energized, the stop collars 24a, 24b are free to rotate. In that case, the wrap spring(s)

are free to engage with the input member 10 and the device will thus exert a braking torque onto the input member 10. If the coils are energized, they generate a magnetic field which pulls the ferromagnetic stop collars 24a, 24b into close contact with the faces of the ferromagnetic cores. Friction between the ferromagnetic faces of the stop collars 24a, 24b and the ferromagnetic cores of the actuators 26a, 26b will thus prevent rotation of the stop collars 24a, 24b. Accordingly, the associated wrap springs will not engage in such a state, and so the device will apply negligible torque to the input member 10.

When the input member 10 is mechanically coupled to the rotor 19 via the engagement of one of the wrap springs 18a, 18b, the input member 10 will experience a braking torque. The magnitude of this braking torque may be related to a spring force of the spring 33, an average radius of the contact surfaces of the rotor 19 that are in contact with the brake pads 31a, 31b, and a friction coefficient between the contact surfaces of the rotor 19 and the brake pads 31a, 31b. By appropriate choice of these spring and rotor parameters, this braking torque can be chosen to meet the particular requirements of an application. Thus, when the brake is engaged, the robot DOF or other mechanism will decelerate very quickly, but not so quickly that it is damaged.

The actuators 26a, 26b can include a variety of elements and be configured in a variety of ways such that they are operable to prevent or permit motion of their respective wrap springs 18a, 18b (via control of the motion of the stop collars 24a, 24b and/or stop tangs 25a, 25b). For example, the actuators 26a, 26b can include electrostatic or electrolaminate clutches, solenoids, motors, hydraulics, pneumatics, heated wax actuators, or other elements configured to prevent, permit, or otherwise control the behavior of the wrap springs 18a, 18b. The actuators 26a, 26b could operate to prevent any motion or rotation of the wrap springs 18a, 18b, e.g., by mechanically coupling the stop collars 24a, 24b to the mechanical ground 27. Alternatively, the actuators 26a, 26b can include slip clutch mechanisms or other systems configured to maintain the rate of rotation of ends 25a, 25b of the wrap springs 18a, 18b at levels that are more than a specified amount (e.g., a specified RPM) and less than the rate of rotation of the input member 10 in their corresponding opposite directions.

In some examples, the actuators 26a, 26b can include electrostatic clutches. Electrostatic clutches are especially well-adapted to actuation of wrap spring clutches of an emergency brake or otherwise-configured wrap spring clutch mechanism as described herein due to the low power requirements, on/off nature, their thin-ness, and their actuation force being related to the area of their electrostatic electrodes. Such electrostatic clutches include first and second plates or electrodes that are separated by at least one layer of insulating dielectric material. Application of a high voltage across the first and second plates results in an attractive force between the plates, preventing relative motion (e.g., sliding) between the plates. One of the plates of such an electrostatic actuator can be formed, e.g., on a stop collar 24a, 24b or other element of a wrap spring clutch and/or brake device as described herein. In some examples, such an electrostatic clutch may be an electrolaminate clutch. Such an electrolaminate clutch has a dielectric material between its electrodes that exhibits a carefully tuned resistivity within a range of resistivities. Details of such electrolaminate clutches are disclosed in U.S. Pat. No. 10,138,953, filed Jul. 25, 2016, whose contents are included herein by reference.

In the case of a power failure, such an electrostatic clutch can become de-energized (due to lack of power), causing the device 200 to act as a brake (e.g., of a robot DOF of which it is a part). Thus such a device is "fail safe" in that it will stop rotation of the DOF in the case of loss of power. Such operation could be facilitated by the introduction of a high-resistance bleeder resistor connected between the plates of the electrostatic clutch to ensure that the holding force between the plates, which is a function of the voltage between the plates, decreases by at least a specified rate when the voltage applied to the plates (e.g., by a high-voltage generator) is withdrawn.

The device 200 thus provides a great amount of controllable braking power while reducing the size, weight, cost, or other properties of the actuator necessary for controlling that braking force by actuating a wrap spring clutch to couple an input member to an "always braked" brake rotor and pads, rather than actuating the brake pads or other elements of the brake rotor/pads assembly itself. However, disengagement of such a wrap spring clutched brake device 200 following engagement of the wrap spring(s) can require the exertion of significant torques on the wrap spring(s) and/or the input member. These forces/torques may include the torque necessary to counter any torques exerted on the input member by, e.g., the force of gravity on robotic limb segments, any payload of the robotic limb, or other components mechanically driven by, and thus coupled to, the input member. Disengagement of the wrap spring(s) 18a, 18b can include back-driving the input member 10 so as to "un-wrap" the engaged wrap spring from the corresponding contact surface 12, 13 of the input member 10. Additionally or alternatively, the actuator 26a, 26b and/or some other component could be configured to exert sufficient force onto the wrap spring(s) 18a, 18b directly (e.g., onto the stop tang(s) 25a, 25b) to disengage the wrap springs from the contact surface(s) of the input member 10.

Figure 3A:
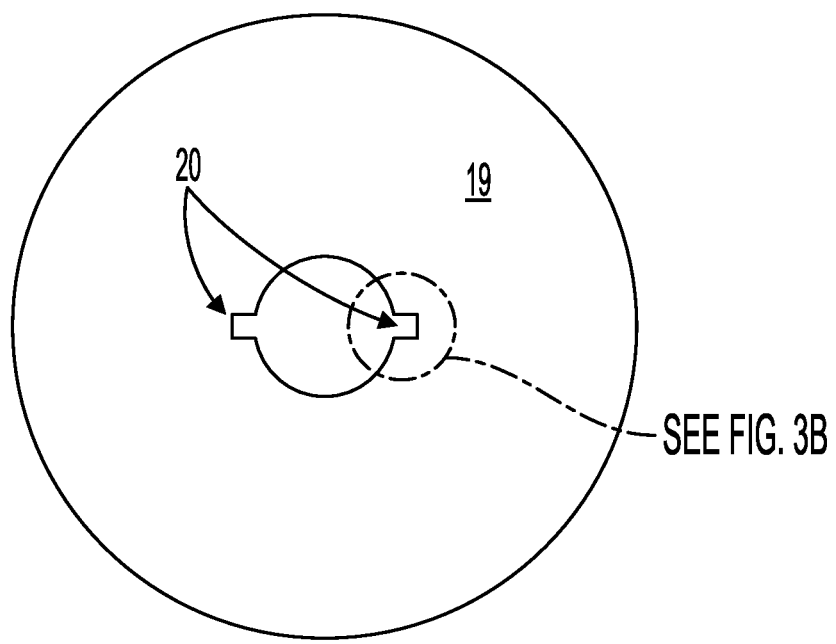
FIG. 3A illustrates elements of a brake mechanism, in accordance with an example implementation.
Figure 3B:
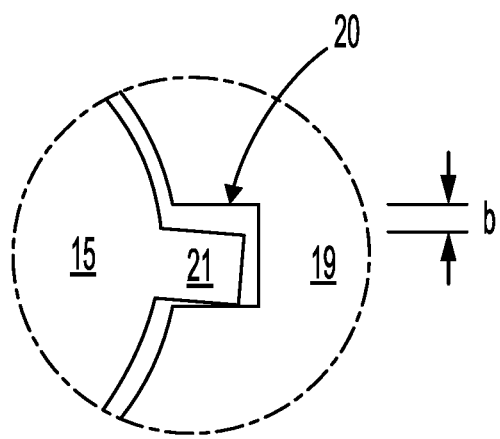
FIG. 3B illustrates elements of the brake mechanism of FIG. 3A, in accordance with an example implementation.

Disengagement requires an amount of relative motion (e.g., a few degrees) between the end of a wrap spring 18a, 18b and the underlying contact surfaces of the input member 10. In order to reduce the amount of torque necessary to disengage the wrap springs, the hub 15 and rotor 19 of the brake member could include features to permit a corresponding amount of relative motion between the hub 15 and rotor 19. This could reduce the magnitude of the necessary disengagement torque by an amount corresponding to the braking torque provided by the brake pads 31a, 31b on the rotor 19. An example of such features is illustrated in FIGS. 3A and 3B. The center of the rotor 19 of the brake member includes two notches 20, which are designed to fit around matching features 21 of the hub 15 of the brake member. By means of these features, significant braking forces can be transmitted between the rotor 19 and the hub 15 while also permitting the rotor 19 and hub 15 to freely rotate relative to each by a small amount (depicted by distance "b" in FIG. 3B). The size of the distance "b" can be specified such that the amount that the rotor 19 and hub 15 can freely rotate relative to each other corresponds to the amount of rotation necessary to disengage the wrap spring(s) 18a, 18b. This allows the brake 200 to be disengaged, following engagement of one of the wrap springs 18a, 18b, without needing to exert sufficient torque to rotate the rotor 19 against the brake pads 31a, 31b.

Note that the small amount of rotation necessary to disengage the wrap spring(s) may correspond to a small fraction of a degree of motion in an associated robot joint (or in the rotation or motion of some other effector), due to the transmission ratio of a transmission interposed between the brake and the drive member of the robot joint—typically a ratio between 50:1 and 150:1 for common industrial robot applications.

A variety of modifications to the wrap spring clutch(es) and/or to other aspects of the wrap spring clutch brake device 200 are possible. For example, a wrap spring clutch brake device could include only one wrap spring clutch, thereby facilitating braking/clutching in only one direction. In some examples, a wrap spring clutched brake could include two wrap springs that are actuated by a single actuator, e.g., by a single actuator operating on a single stop collar having features that interact with tangs or other features of two wrap springs. This could provide reduced size, weight, cost, complexity, or other benefits. Alternatively, two actuators could be provided (e.g., as depicted in FIGS. 2A and 2B) to allow for independent control of braking in the clockwise and counter-clockwise directions or to provide some other benefits.

In some examples, a wrap spring of a wrap spring clutch and/or of a wrap spring clutched brake could be configured to engage with an input member (or a brake member) by "wrapping down" via a first end and to be rigidly coupled with a brake member (or an input member) via an opposite second end, rather than via "wrapping down" onto the brake member. This could provide for reduced clutch/brake size or other benefits. Alternatively, the wrap springs could be configured to "wrap down" onto both the input member and brake member. This could provide for increased clutching power/torque, improved distribution of forces across the wrap spring, increased device lifetime, reduced stress in the wrap spring, or other benefits.

Figure 4:
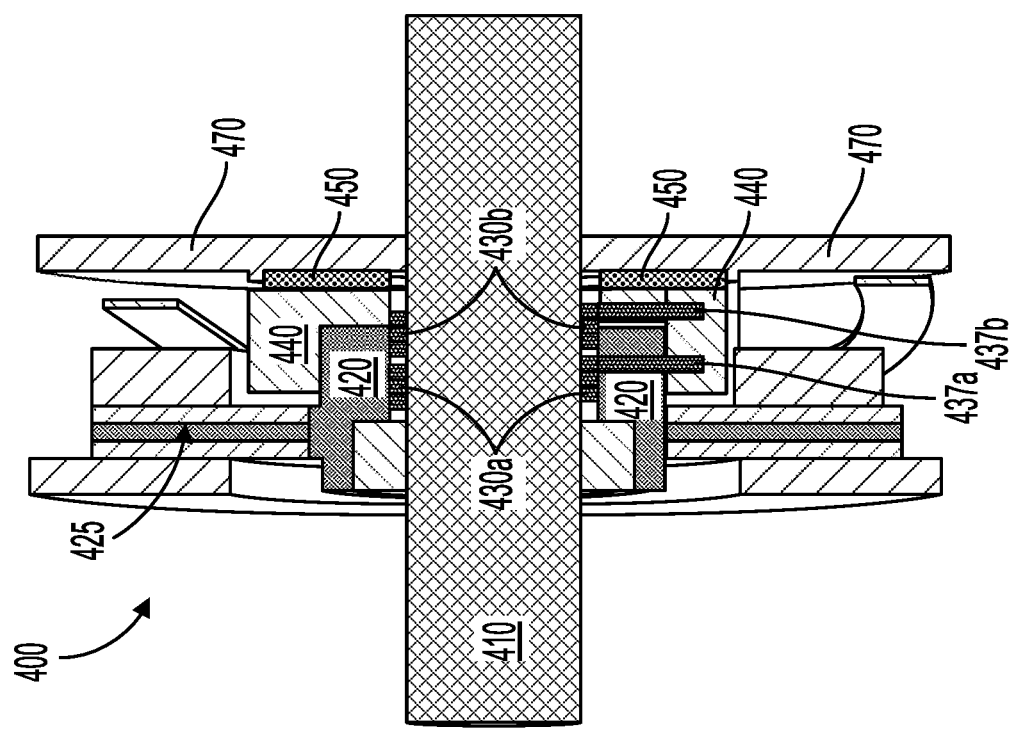
FIG. 4 illustrates elements of a brake mechanism, in accordance with an example implementation.

FIG. 4 depicts an example wrap spring clutched brake device 400 having a single actuator 450 and two wrap springs 430*a*, 430*b* that are rigidly coupled to the brake member 420 (or "tail attached"). The wrap springs 430*a*, 430*b* are in contact with, and capable of "wrapping down" to engage with, respective contact surfaces of an input member 410, thereby mechanically coupling the input member 410 to the brake member 420. A contact surface of the brake member 420 is maintained in contact with a brake pad 425, which thus continuously opposes rotation of the brake member 420. The actuator 450 (which includes an electrostatic clutch, as depicted in FIG. 4) can operate to prevent such engagement of the wrap springs 430*a*, 430*b* by mechanically coupling a stop collar 440 to a mechanical ground 470, thereby preventing motion of stop tangs 437*a*, 437*b* at the ends of respective wrap springs 430*a*, 430*b*.

Figure 5:
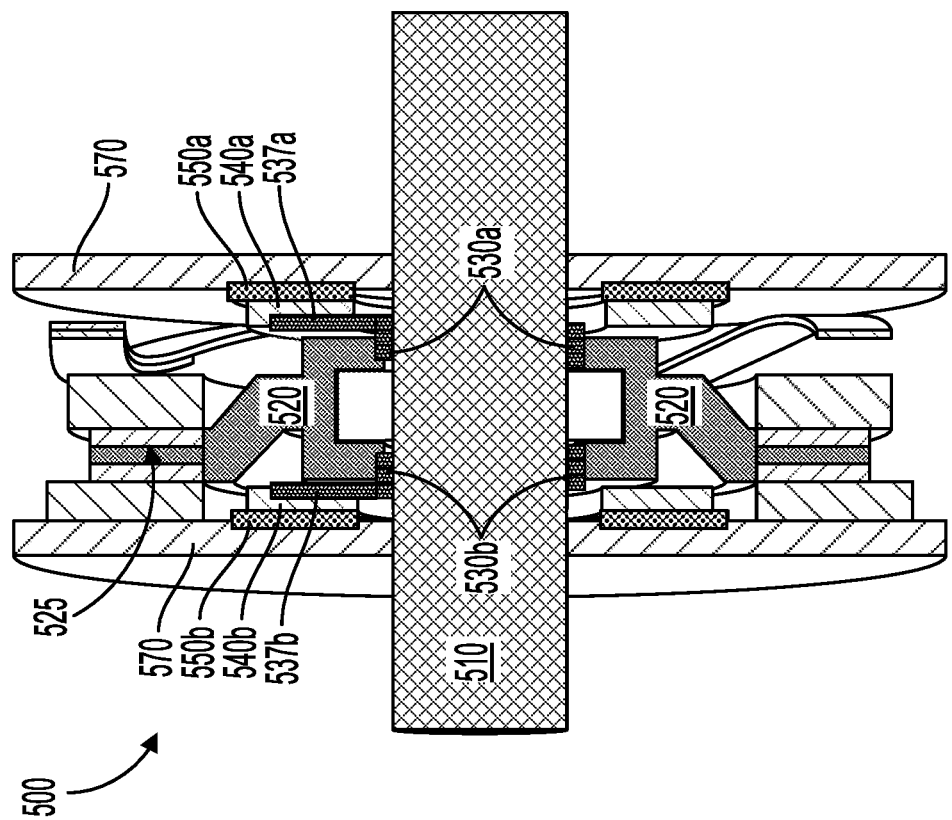
FIG. 5 illustrates elements of a brake mechanism, in accordance with an example implementation.

Alternatively, a "tail attached" bidirectional wrap spring clutch brake device could include two actuators (e.g., to permit the direction of braking to be independently controlled). FIG. 5 depicts an example wrap spring clutched brake device 500 having two actuators 550*a*, 550*b* and two wrap springs 530*a*, 530*b* that are rigidly coupled to the brake member 520 (or "tail attached"). The wrap springs 530*a*, 530*b* are in contact with, and capable of "wrapping down" to engage with, respective contact surfaces of an input member 510, thereby mechanically coupling the input member 510 to the brake member 520. A contact surface of the brake member 520 is maintained in contact with a brake pad 525, which thus continuously opposes rotation of the brake member 520. The actuators 550*a*, 550*b* (which include electrostatic clutches, as depicted in FIG. 5) can operate to prevent such engagement of their respective wrap springs 530*a*, 530*b* by mechanically coupling respective stop collars 540*a*, 540*b* to a mechanical ground 570, thereby preventing motion of respective stop tangs 537*a*, 537*b* at the ends of respective wrap springs 530*a*, 530*b*.

The wrap spring(s) of wrap spring clutches and/or wrap spring clutch brakes described above operate by "wrapping down" onto a contact surface of an input member, brake member, or other mechanical element that is enclosed within the wrap spring, thereby engaging the wrap spring with the contact surface and permitting transmission of more substantial forces between the mechanical element and wrap spring than if the wrap spring was in disengaged contact with the contact surface. However, as will be explained in greater detail below, it is also possible for the wrap spring of a clutch, brake, or other mechanism to "wrap upward" into a contact surface of a drive member (e.g., a concave, drum-shaped member) that encloses the wrap spring. Such a configuration can provide a number of benefits. For example, such an "inside-out" wrap spring clutch could permit engagement of the wrap spring with the enclosing contact surface even at drive shaft rotation speeds that might, due to the levels of centripetal force generated, hinder or prevent "wrapping down" of a wrap spring clutch onto a contact surface located within the wrap spring.

Figure 6:
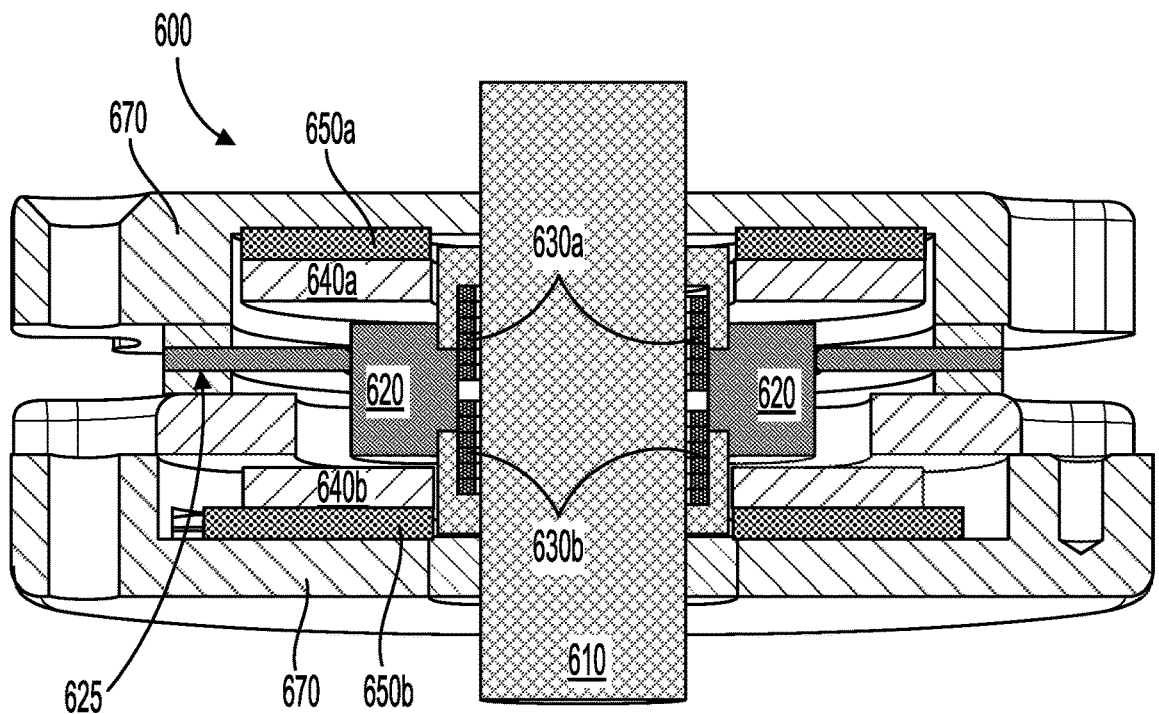
FIG. 6 illustrates elements of a brake mechanism, in accordance with an example implementation.

FIG. 6 depicts an example wrap spring clutched brake device 600 having two actuators 650*a*, 650*b* and two "inside out" wrap springs 630*a*, 630*b*. These wrap springs 630*a*, 630*b* have respective first portions in contact with and capable of "wrapping upward" into, and thereby engaging with, respective inward-facing contact surfaces of an input member 610. These wrap springs 630*a*, 630*b* also have respective second portions in contact with and capable of "wrapping upward" into, and thereby engaging with, respective inward-facing contact surfaces of a brake member 620. A contact surface of the brake member 620 is maintained in contact with a brake pad 625, which thus continuously opposes rotation of the brake member 620. The actuators 650*a*, 650*b* (which include electrostatic clutches, as depicted in FIG. 6) can operate to prevent such engagement of their respective wrap springs 630*a*, 630*b* by mechanically coupling respective stop collars 640*a*, 640*b* to a mechanical ground 670, thereby preventing motion of respective stop tangs (not shown) at the ends of respective wrap springs 630*a*, 630*b*.

Mechanical coupling between the stop collars 640*a*, 640*b* and tangs or other features of the wrap springs 630*a*, 630*b* could be accomplished in a variety of ways. In some examples, the tangs of the wrap spring(s) could be extended and pass within the coils of the wrap spring and through a channel or other feature formed in the brake member 620 (not shown) so as to come into physical contact with a corresponding stop collar. In some examples, the stop collar(s) and wrap spring(s) could include magnets or other magnetic material sufficient to couple torques between the stop collar and the tang or other element(s) of the corresponding wrap spring via magnetic fields. For example, the stop collar(s) could include a number of permanent magnets arranged symmetrically to form the input member of a magnetic coupling, with the second member of the magnetic coupling being located inside a portion of the input member 610 and in close proximity to a tang of a corresponding wrap spring (not shown). In such examples, any enclosing contact surface and/or other portions of the input member 610 could be composed of non-magnetic materials (e.g., low-permeability materials) so as to reduce interference in the magnetic coupling between the magnetic coupling input member of the stop collar(s) and the corresponding magnetic coupling output member that is associated with the tang or other portion of the wrap spring. In some examples, the ordering, relative location, or other aspects of the configuration of the wrap spring clutched brake device 600 could be modified to facilitate mechanical coupling between wrap springs and stop collars/actuators thereof.

Figure 7:
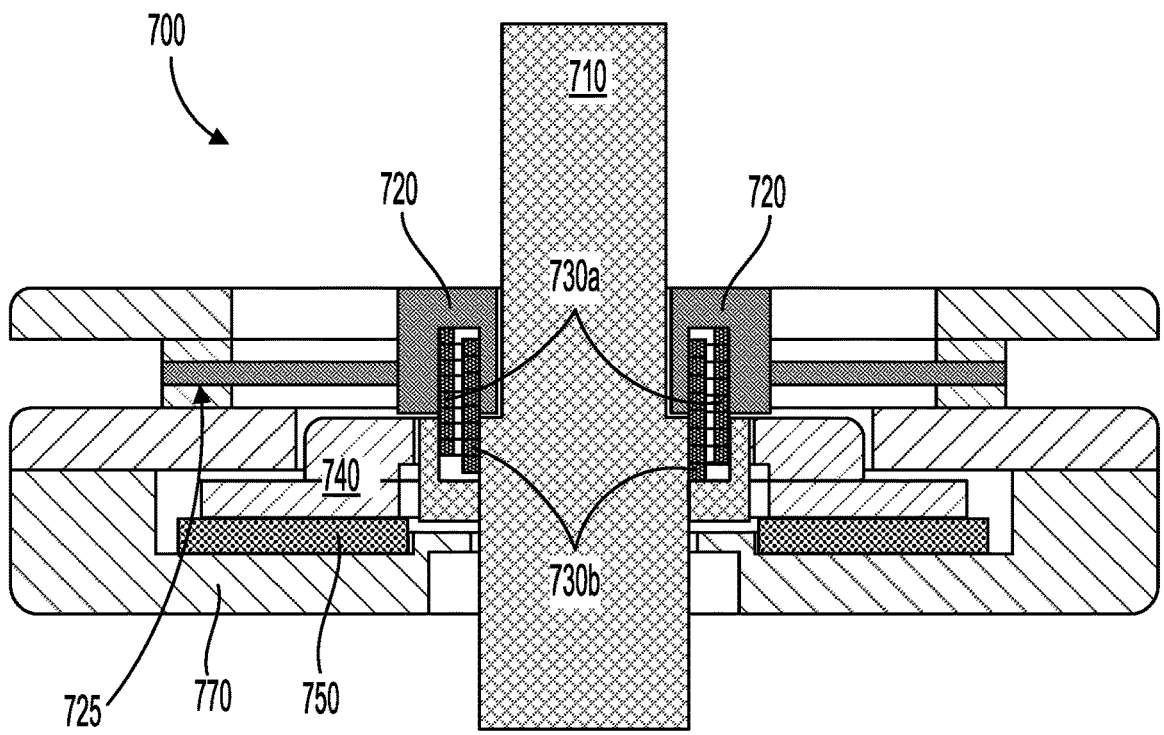
FIG. 7 illustrates elements of a brake mechanism, in accordance with an example implementation.

Another benefit of such "inside out" wrap springs is that a bidirectional wrap spring clutch and/or wrap spring clutched brake could include a "traditional" wrap spring nested inside of an "inside out" wrap spring, thus allowing for a reduced size (e.g., reduced length along an axial direction) of the wrap spring clutch and/or wrap spring clutched brake. FIG. 7 depicts an example wrap spring clutched brake device 700 having a single actuator 750 an "inside out" wrap spring 730*a*, and a "standard" wrap spring 730*b* nested inside the "inside out" wrap spring 730*a*. The "inside out" wrap spring 730*a* is in contact with and capable of "wrapping upward" into, and thereby engaging with, respective inward-facing contact surfaces of an input member 710 and a brake member 720. The "standard" wrap spring 730*b* is in contact with and capable of "wrapping downward" onto, and thereby engaging with, respective outward-facing contact surfaces of the input member 710 and the brake member 720. A contact surface of the brake member 720 is maintained in contact with a brake pad 725, which thus continuously opposes rotation of the brake member 720. The actuator 750 (which includes an electrostatic clutch, as depicted in FIG. 7) can operate to prevent such engagement of the wrap springs 730*a*, 730*b* by mechanically coupling a stop collar 740 to a mechanical ground 770, thereby preventing motion of respective stop tangs (not shown) at the ends of respective wrap springs 730*a*, 730*b*. Mechanical coupling between the stop collar 740 and tangs or other features of the wrap springs 730*a*, 730*b* could be accomplished in a variety of ways. This could include employing one or more of the features or methods described above in connection with FIG. 6.

In some examples, a wrap spring clutch and/or wrap spring clutched brake could include a nested double wrap spring. Such a nested double wrap spring could include a first sub-spring nested within and rigidly coupled to (via respective spring ends) a second sub-spring. The first sub-spring can be in contact with and capable of "wrapping down" onto an outward-facing contact surface of an inner member (e.g., an input member) and the second sub-spring can be in contact with and capable of "wrapping up" into an inward-facing contact surface of an outer member (e.g., an output member, a brake member). The use of such a nested double wrap spring could allow for a reduced size (e.g., reduced length along an axial direction) of the wrap spring clutch and/or wrap spring clutched brake or other benefits.

Figure 8A:
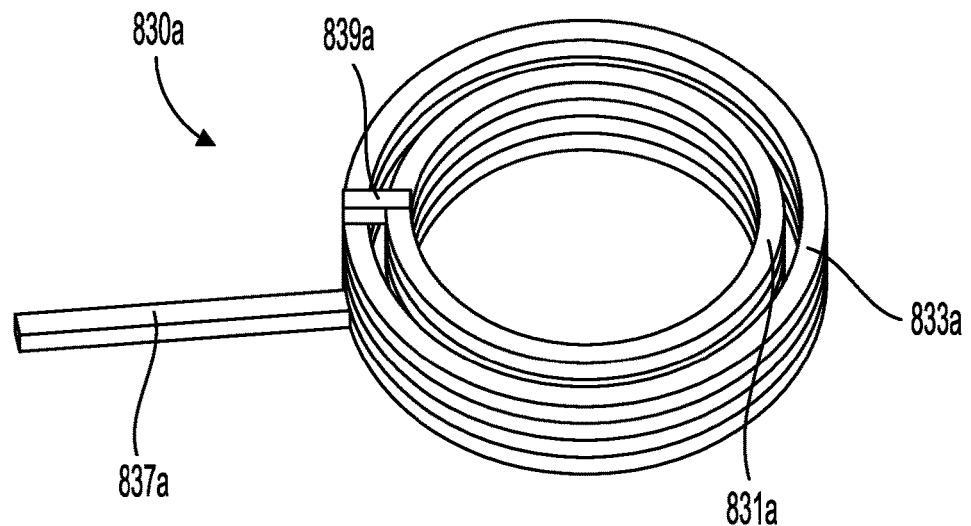
FIG. 8A illustrates a hybrid wrap spring, in accordance with an example implementation.

FIG. 8A depicts an example nested double wrap spring 830*a* having a first, inner sub-spring 831*a* nested within a second, outer sub-spring 833*a*. A first end of the second sub-spring 833*a* ends in a stop tang 837*a* that can be used, e.g., to prevent motion of the nested double wrap spring 830*a* and thereby prevent the nested double wrap spring 830*a* from engaging with contact surfaces of input members, brake members, output members, or other mechanical elements. The first sub-spring 831*a* is rigidly coupled to the second sub-spring 833*a* at an end 839*a* of the first sub-spring 831*a*.

Figure 8B:
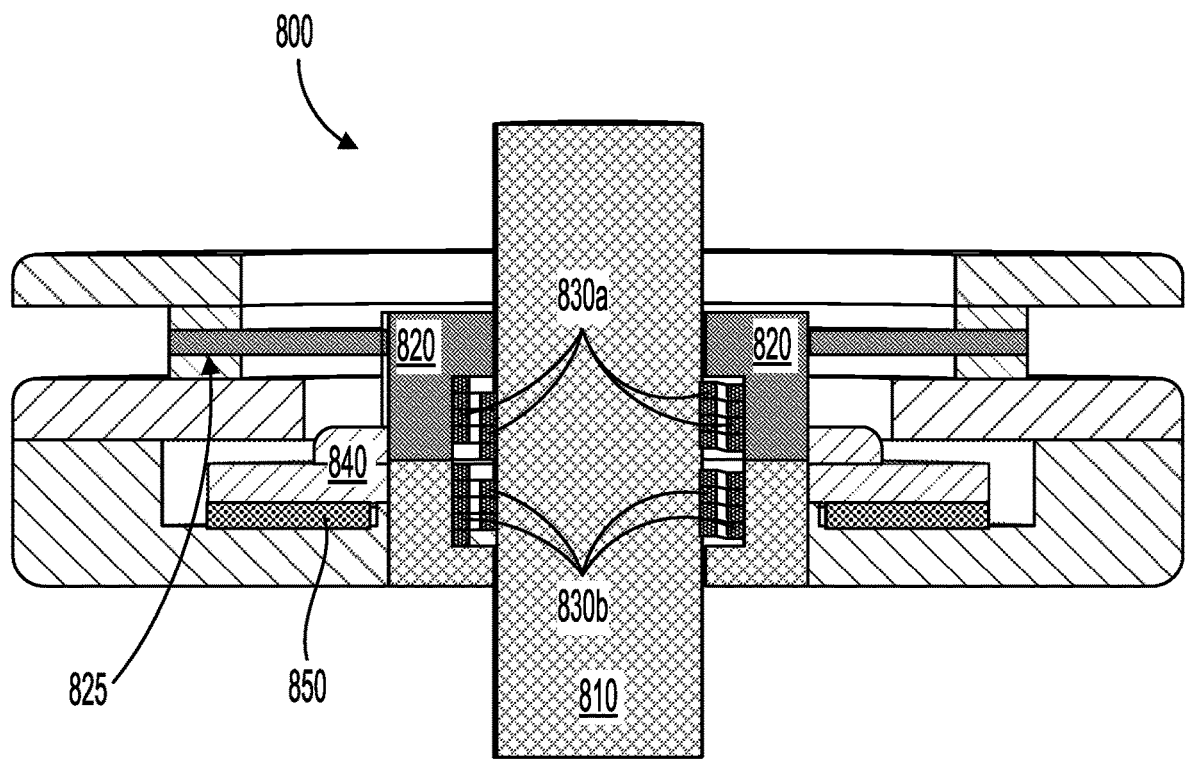
FIG. 8B illustrates elements of a brake mechanism that includes the hybrid wrap spring of FIG. 8A, in accordance with an example implementation.

FIG. 8B depicts an example wrap spring clutched brake device 800 that includes the nested double wrap spring 830*a*. The device 800 includes a single actuator 850 the nested double wrap spring 830*a*, and an additional nested double wrap spring 830*b*. The first sub-spring 831*a* of the first nested double wrap spring 830*a* is in contact with and capable of "wrapping downward" onto, and thereby engaging with, an outward-facing contact surface of an input member 810. The second sub-spring 833*a* of the first nested double wrap spring 830*a* is in contact with and capable of "wrapping upward" onto, and thereby engaging with, an inward-facing contact surface of a brake member 820. A contact surface of the brake member 820 is maintained in contact with a brake pad 825, which thus continuously opposes rotation of the brake member 820. The actuator 850 (which includes an electrostatic clutch, as depicted in FIG. 8) can operate to prevent such engagement of the nested double wrap springs 830*a*, 830*b* by mechanically coupling a stop collar 840 to a mechanical ground 870, thereby preventing motion of respective stop tangs (not depicted in FIG. 8B) at the ends of respective nested double wrap springs 830*a*, 830*b*. Mechanical coupling between the stop collar 840 and tangs or other features of the wrap springs 830*a*, 830*b* could be accomplished in a variety of ways. This could include employing one or more of the features or methods described above in connection with FIG. 6.

Figure 10:
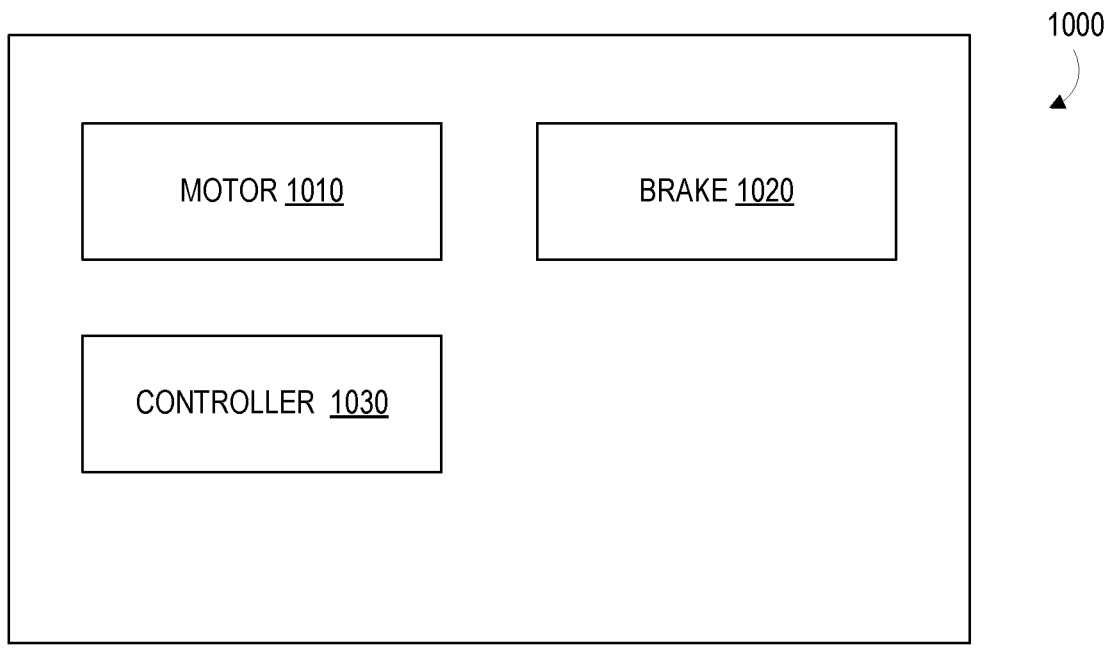
FIG. 10 shows a block diagram of elements of an example system.

FIG. 10 shows an example system 1000 as described elsewhere herein. The system 1000 includes a motor 1010, a brake 1020, and a controller 1030 as described elsewhere herein.

IV. EXAMPLE METHODS

As noted above, a wrap spring clutched brake as described herein operates to provide braking force by permitting a wrap spring to engage with an input member (or other mechanical member), thereby mechanically coupling the input member to a brake member whose rotating is opposed by a brake pad that is maintained in continuous contact with the brake member. To disengage such a brake, the wrap spring can be disengaged from the contact surface of the input member. This can be accomplished by a dedicated actuator (e.g., the same actuator used to exert force to prevent the wrap spring from engaging when it has already been disengaged), thereby making the brake assembly more "plug and play," in that it does not require additional elements/operations to engage and disengage as a brake. However, the force necessary to disengage the wrap spring is much greater than the force necessary to prevent the wrap spring from engaging, and may be increased by an amount necessary to counter forces exerted on the input member (e.g., by gravity operating on a robot limb segment coupled to the input member). This means that an actuator capable of disengaging the warp spring on its own may be much larger, heavier, and/or more costly or complex than an actuator configured only to prevent the wrap spring form engaging.

Additionally or alternatively, a motor or other driving element used to drive the input member during normal (i.e., not-braking) operation may be employed to disengage the wrap spring. Such a motor is likely to be capable of exerting significant torques that are greater than, or at least commensurate with, the torques exerted on the input member and/or brake (e.g., by the force of gravity on robot limb segments). Thus, disengagement of the wrap spring could include driving such a motor in a "reverse" direction by an amount sufficient to disengage the wrap spring (usually less than a few degrees). This could be done in coordination with the operation of an actuator of the wrap spring clutched brake to exert torque to disengage the wrap spring. Such coordinated operation of the actuator and motor could include the actuator exerting a disengaging force directly on a tang or other element of the wrap spring as the motor is exerting a torque to rotate the input member in a direction for disengagement. Alternatively, such coordinated operation of the actuator and motor could include the actuator simply not exerting any forces on the wrap spring that interfere with the operation of the motor to exert a torque to rotate the input member in a direction for disengagement (e.g., the actuator not operating to couple the wrap spring to a mechanical ground, which could interfere with the motion of the wrap spring necessary to disengage from the input member.

Once the wrap spring is disengaged, a corresponding actuator of the brake could then operate to prevent re-engagement of the wrap spring by, e.g., coupling an end of the wrap spring to a mechanical ground, thereby preventing motion of the end of the wrap spring that might lead to re-engagement. At the same time, the motor could operate to rotate the input member in the "forward" direction, relative to the recently disengaged wrap spring, without causing re-engagement of the wrap spring due to the action of the actuator in preventing such engagement. Where the wrap spring clutched brake includes multiple actuators corresponding to wrap springs that engage in different directions, these actuators could be operated in coordination with the motor to prevent engagement of any of the other wrap springs as a result of "jogging" the input member to disengage a previously-engaged wrap spring (e.g., by preventing motion of the ends of the other wrap spring(s) as the motor is disengaging the engaged wrap spring while permitting motion of the end of the engaged wrap spring).

FIG. 9 is a flowchart of a method 900 for operating a motor that drives an input shaft of a wrap spring clutched brake and an actuator of that brake to disengage the brake after it has become engaged (e.g., due to a power loss or due to an affirmative operation to engage the brake). The brake includes (i) an input member having a first contact surface, wherein the input member is coupled to an output of the motor; (ii) a brake member having a brake surface; (iii) a brake pad that is in contact with the brake surface of the brake member such that the brake pad opposes rotation of the brake member; (iv) a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member; and (v) a first actuator, wherein the first actuator is coupled to the first end of the first wrap spring. The brake and motor are part of a system that also includes a controller that is capable of operating the motor and actuator to perform the steps of the method 900, among other operations. The system could be part of a robot arm or of some other system where such braking and later disengagement of the brake is advantageous.

The method 900 includes, during a disengagement time period that is subsequent to a braking time period, operating the motor to rotate the input member in a first direction, thereby disengaging the first portion of the first wrap spring from the first contact surface of the input member, wherein the first actuator allows motion of the first end of the first wrap spring during the braking time period such that rotation of the input member in a second direction during the braking time period causes the first portion of the first wrap spring to engage with the first contact surface of the input member, thereby mechanically coupling the input member to the brake member such that the brake pad opposes rotation of the input member in the second direction, wherein the second direction is opposite the first direction (910). The method 900 additionally includes, subsequent to the disengagement time period, (i) operating the first actuator to prevent motion of the first end of the first wrap spring such that the first portion of the first wrap spring does not engage with the first contact surface of the input member and (ii) operating the motor to rotate the input member in the second direction (920). The method 900 may include additional or alternative steps or features.

V. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:
1. A brake comprising:
an input member having a first contact surface and a second contact surface;
a brake member having a brake surface;
a brake pad that is in contact with the brake surface of the brake member such that the brake pad opposes rotation of the brake member;
a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member;
a first actuator, wherein the first actuator is operable for preventing an engaged mode of the first wrap spring and for enabling the engaged mode of the first wrap spring, wherein preventing the engaged mode of the first wrap spring comprises preventing motion of the first end of the first wrap spring such that the first portion of the first wrap spring does not engage with the first contact surface of the input member, wherein enabling the engaged mode of the first wrap spring comprises allowing motion of the first end of the first wrap spring such that the first portion of the first wrap spring engages with the first contact surface of the input member, thereby mechanically coupling the input member to the brake member such that the brake pad opposes rotation of the input member, and wherein the engaged mode of the first wrap spring causes the brake member to oppose rotation of the input member in a first direction;
a second wrap spring having a first end and a second end, wherein a first portion of the second wrap spring is proximate to the first end of the second wrap spring and is in contact with the second contact surface of the input member, and wherein a second portion of the second wrap spring is proximate to the second end of the second wrap spring and is in contact with the brake member; and a second actuator, wherein the second actuator is operable for preventing an engaged mode of the second wrap spring and for enabling the engaged mode of the second wrap spring, wherein preventing the engaged mode of the second wrap spring comprises preventing motion of the first end of the second wrap spring such that the first portion of the second wrap spring does not engage with the second contact surface of the input member, and wherein enabling the engaged mode of the second wrap spring comprises allowing motion of the first end of the second wrap spring such that the first portion of the second wrap spring engages with the second contact surface of the input member, thereby mechanically coupling the input member to the brake member such that the brake pad opposes rotation of the input member in a second direction, and wherein the second direction is opposite the first direction.

2. The brake of claim 1, further comprising:
a spring, wherein the spring applies a force between a mechanical ground and the brake pad to maintain the brake pad in contact with the brake surface such that the brake pad opposes rotation of the brake member.

3. The brake of claim 1, wherein the first actuator preventing motion of the first end of the first wrap spring such that the first portion of the first wrap spring does not engage with the first contact surface of the input member comprises the first actuator mechanically coupling the first end of the first wrap spring to a mechanical ground, wherein the first end is prevented from rotating relative to the mechanical ground.

4. The brake of claim 3, further comprising a stop collar, wherein the first actuator mechanically coupling the first end of the first wrap spring to the mechanical ground comprises the first actuator mechanically coupling the stop collar to the mechanical ground, and wherein the stop collar includes a cog that prevents rotation of the first end of the first wrap spring in a first direction when the input member rotates in the first direction and the first actuator is mechanically coupling the stop collar to the mechanical ground.

5. The brake of claim 4, wherein the first actuator comprises an electrostatic clutch.

6. The brake of claim 4, wherein the first actuator comprises an electromagnetic clutch.

7. The brake of claim 1, wherein the brake member comprises a rotor and a hub, wherein the rotor includes the brake surface, wherein the second portion of the first wrap spring is in contact with the hub, and wherein the rotor and the hub include cogging features that permit a limited degree of rotation of the rotor and the hub relative to each other.

8. The brake of claim 1, wherein the second portion of the first wrap spring is rigidly attached to the brake member.

9. The brake of claim 1, wherein the second portion of the first wrap spring is in contact with a contact surface of the brake member, and wherein enabling the engaged mode of the first wrap spring comprises allowing motion of the first end of the first wrap spring such that the second portion of the first wrap spring engages with the contact surface of the brake member, thereby mechanically coupling the input member to the brake member such that the brake pad opposes rotation of the input member.

10. The brake of claim 9, wherein one of: (i) the first portion of the first wrap spring is nested within the second portion of the first wrap spring or (ii) the second portion of the first wrap spring is nested within the first portion of the first wrap spring.

11. The brake of claim 1, wherein the first portion of the first wrap spring is located within the first contact surface of the input member.

12. A brake comprising:
an input member having a first contact surface and a second contact surface;
a brake member having a brake surface;
a brake pad that is in contact with the brake surface of the brake member such that the brake pad opposes rotation of the brake member;
a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member;
a first actuator, wherein the first actuator is operable for preventing an engaged mode of the first wrap spring and for enabling the engaged mode of the first wrap spring, wherein preventing the engaged mode of the first wrap spring comprises preventing motion of the first end of the first wrap spring such that the first portion of the first wrap spring does not engage with the first contact surface of the input member, wherein enabling the engaged mode of the first wrap spring comprises allowing motion of the first end of the first wrap spring such that the first portion of the first wrap spring engages with the first contact surface of the input member, thereby mechanically coupling the input member to the brake member such that the brake pad opposes rotation of the input member, and wherein the input member has a second contact surface, wherein the engaged mode of the first wrap spring opposes rotation of the input member in a first direction; and
a second wrap spring having a first end and a second end, wherein a first portion of the second wrap spring is proximate to the first end of the second wrap spring and is in contact with a second contact surface of the input member, and wherein a second portion of the second wrap spring is proximate to the second end of the second wrap spring and is in contact with the brake member,
wherein the first actuator is operable for preventing an engaged mode of the second wrap spring and for enabling the engaged mode of the second wrap spring, wherein preventing the engaged mode of the second wrap spring comprises preventing motion of the first end of the second wrap spring such that the first portion of the second wrap spring does not engage with the second contact surface of the input member, wherein enabling the engaged mode of the second wrap spring comprises allowing motion of the first end of the second wrap spring such that the first portion of the second wrap spring engages with the second contact surface of the input member, thereby mechanically coupling the input member to the brake member such that the brake pad opposes rotation of the input member in a second direction, and wherein the second direction is opposite the first direction.

13. The brake of claim 12, wherein one of: (i) the first portion of the first wrap spring is nested within the first portion of the second wrap spring and the first portion of the second wrap spring is located within the second contact surface of the input member, or (ii) the first portion of the second wrap spring is nested within the first portion of the first wrap spring and the first portion of the first wrap spring is located within the first contact surface of the input member.

14. A system comprising:
a motor;
a brake comprising:
an input member having a first contact surface, wherein the input member is coupled to an output of the motor;
a brake member having a brake surface;
a brake pad that is in contact with the brake surface of the brake member such that the brake pad opposes rotation of the brake member;
a first wrap spring having a first end and a second end, wherein a first portion of the first wrap spring is proximate to the first end and is in contact with the first contact surface of the input member, and wherein a second portion of the first wrap spring is proximate to the second end and is in contact with the brake member; and
a first actuator, wherein the first actuator is coupled to the first end of the first wrap spring; and
a controller comprising one or more processors, wherein the controller is configured to perform controller operations comprising:
during a disengagement time period that is subsequent to a braking time period, operating the motor to rotate the input member in a first direction, thereby disengaging the first portion of the first wrap spring from the first contact surface of the input member, wherein the first actuator allows motion of the first end of the first wrap spring during the braking time period such that rotation of the input member in a second direction during the braking time period causes the first portion of the first wrap spring to engage with the first contact surface of the input member, thereby mechanically coupling the input member to the brake member such that the brake pad opposes rotation of the input member in the second direction, wherein the second direction is opposite the first direction; and
subsequent to the disengagement time period, (i) operating the first actuator to prevent motion of the first end of the first wrap spring such that the first portion of the first wrap spring does not engage with the first contact surface of the input member and (ii) operating the motor to rotate the input member in the second direction.

15. The system of claim 14, wherein the brake member comprises a rotor and a hub, wherein the rotor includes the brake surface, wherein the second portion of the first wrap spring is in contact with the hub, and wherein the rotor and the hub include cogging features that permit a limited degree of rotation of the rotor and the hub relative to each other.

16. The system of claim 14, wherein the controller operations also comprise, during the braking time period, operating the first actuator to allow motion of the first end of the first wrap spring such that rotation of the input member in the second direction results in the first portion of the first wrap spring engaging with the first contact surface of the input member.

17. A clutch comprising:
an input member having a contact surface;
an output member; and
a wrap spring having a first end and a second end, wherein a first portion of the wrap spring is proximate to the first end and is in contact with the contact surface of the input member, wherein a second portion of the wrap spring is proximate to the second end and is in contact with the output member, wherein the first portion of the wrap spring is located within the contact surface of the input member, wherein rotation of the input member in a first direction when motion of the first end of the wrap spring relative to the input member is not prevented results in the first portion of the wrap spring engaging with the contact surface of the input member, thereby coupling the input member to the output member such that the output member receives, from the input member, a torque in the first direction, wherein the wrap spring is a nested double wrap spring having a first sub-spring and a second sub-spring, wherein the first sub-spring comprises the first portion of the wrap spring, wherein the second sub-spring comprises the second portion of the wrap spring, wherein the second portion of the wrap spring is in contact with a contact surface of the output member, wherein the second portion of the wrap spring is located within the first portion of the wrap spring, and wherein rotation of the input member in a first direction when motion of the first end of the wrap spring relative to the input member is not prevented results in the second portion of the wrap spring engaging with the contact surface of the output member, thereby coupling the input member to the output member such that the output member receives, from the input member, a torque in the first direction.

* * * * *